United States Patent
Oku et al.

(10) Patent No.: US 12,498,025 B2
(45) Date of Patent: Dec. 16, 2025

(54) FEED SCREW MECHANISM AND ELECTRIC ACTUATOR

(71) Applicant: NTN CORPORATION, Osaka (JP)

(72) Inventors: Yuta Oku, Shizuoka (JP); Akio Kato, Shizuoka (JP); Kayo Sakai, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 18/692,948

(22) PCT Filed: Sep. 7, 2022

(86) PCT No.: PCT/JP2022/033550
§ 371 (c)(1),
(2) Date: Mar. 18, 2024

(87) PCT Pub. No.: WO2023/053872
PCT Pub. Date: Apr. 6, 2023

(65) Prior Publication Data
US 2024/0426370 A1    Dec. 26, 2024

(30) Foreign Application Priority Data

Sep. 28, 2021  (JP) .................................. 2021-158093

(51) Int. Cl.
*F16H 25/24*    (2006.01)
*F15B 15/14*    (2006.01)
(Continued)

(52) U.S. Cl.
CPC ............. *F16H 25/24* (2013.01); *F15B 15/14* (2013.01); *F16H 25/20* (2013.01);
(Continued)

(58) Field of Classification Search
CPC ............................ F16H 25/24; F15B 2015/1495
See application file for complete search history.

(56) References Cited

U.S. PATENT DOCUMENTS

| | | | |
|---|---|---|---|
| 8,618,700 B2 * | 12/2013 | Muramatsu | F16H 25/20 310/12.01 |
| 8,656,798 B2 * | 2/2014 | Kawahara | F16H 25/20 74/89.32 |

(Continued)

FOREIGN PATENT DOCUMENTS

| | | |
|---|---|---|
| CN | 104736894 | 6/2015 |
| JP | 52-30462 | 7/1977 |

(Continued)

OTHER PUBLICATIONS

Machine translation of JP-2016022753-A (Year: 2016).*
International Search Report issued Nov. 29, 2022 in corresponding International Application No. PCT/JP2022/033550.

*Primary Examiner* — Randell J Krug
(74) *Attorney, Agent, or Firm* — WENDEROTH, LIND & PONACK, L.L.P.

(57) ABSTRACT

A feed screw mechanism includes a rotary member having a female screw portion, a linear motion member having a male screw portion screwed to the female screw portion and making a linear motion with rotation of the rotary member, a lubricant between the female and male screw portions, a housing housing the rotary and linear motion members, and a wall portion protruding, in a radial direction, from the outer peripheral surface of the linear motion member. The wall portion moves together with the linear motion member, and an outer radial end portion of the wall portion is disposed: to not contact the inner peripheral surface of the housing and a member provided on the inner peripheral surface of the housing; or to be slidable with respect to the inner peripheral surface of the housing or the member provided on the inner peripheral surface of the housing.

5 Claims, 3 Drawing Sheets

(51) Int. Cl.
 *F16H 25/20* (2006.01)
 *F16H 57/04* (2010.01)

(52) U.S. Cl.
 CPC .. *F16H 57/0497* (2013.01); *F15B 2015/1495* (2013.01); *F16H 2025/2081* (2013.01)

(56) References Cited

U.S. PATENT DOCUMENTS

| | | |
|---|---|---|
| 2008/0006105 A1 | 1/2008 | Ko |
| 2013/0119786 A1 | 5/2013 | Muramatsu et al. |
| 2013/0255419 A1 | 10/2013 | Iida et al. |
| 2015/0122065 A1* | 5/2015 | Oka .................... F16H 25/2418 74/424.81 |
| 2015/0285348 A1 | 10/2015 | Ikeda et al. |
| 2017/0152926 A1 | 6/2017 | Ikeda et al. |
| 2017/0203783 A1 | 7/2017 | Yamashita et al. |
| 2019/0107184 A1* | 4/2019 | Matsuto ................. F16H 57/02 |

FOREIGN PATENT DOCUMENTS

| | | |
|---|---|---|
| JP | 2005-25321 | 1/2005 |
| JP | 2008-2566 | 1/2008 |
| JP | 2013-106436 | 5/2013 |
| JP | 5192074 | 5/2013 |
| JP | 2016-22753 | 2/2016 |
| JP | 2016022753 A * | 2/2016 |
| JP | 2016-40473 | 3/2016 |
| JP | 2017-128182 | 7/2017 |
| WO | 2013/168432 | 11/2013 |

\* cited by examiner

FEED SCREW MECHANISM AND ELECTRIC ACTUATOR

TECHNICAL FIELD

The present invention relates to a feed screw mechanism and an electric actuator.

BACKGROUND ART

As an electric actuator used for an automatic transmission mechanism, a brake mechanism, a steering mechanism, or the like of an automobile, an electric actuator, using a feed screw mechanism that converts rotary motions of an electric motor into linear motions, is known.

In such a feed screw mechanism, grease as a lubricant is generally caused to fill between a screw shaft and a nut in order to improve operability and durability. However, when the screw shaft makes linear motions, the grease in the nut gradually leaks to the outside as the screw shaft makes the linear motions. When the amount of the grease between the nut and the screw shaft decreases as a result of the grease leaking to the outside, operability and durability are deteriorated.

In order to solve such a problem, a configuration has conventionally been proposed, in which a seal member for preventing leakage of the grease is provided between the nut and the screw shaft (see, e.g., Patent Literatures 1 to 4).

CITATIONS LIST

Patent Literature

Patent Literature 1: WO 2013-168432 A
Patent Literature 2: JP 2008-2566 A
Patent Literature 3: JP 2005-25321 A
Patent Literature 4: JP 5192074 B2

SUMMARY OF INVENTION

Technical Problems

In the feed screw mechanism as described above, the screw shaft makes forward and backward motions in the axial direction with the rotation of the nut. Therefore, if foreign matter adheres to the outer peripheral surface of the screw shaft exposed from the nut, there is a risk that the foreign matter may enter the nut with a backward motion of the screw shaft. If foreign matter enters the nut to be mixed into the grease, there is a risk that the properties of the grease may change to deteriorate the operability and durability of the feed screw mechanism.

Examples of a method of highly preventing such entry of foreign matter into the nut include a method of increasing the contact area of the seal member with respect to the screw shaft or increasing a contact pressure. However, if the contact area of the seal member with respect to the screw shaft is increased or a contact pressure is increased, the sliding resistance between the screw shaft and the seal member is increased, and there is a concern that the operation efficiency of the feed screw mechanism may be decreased.

Therefore, an object of the present invention is to provide a feed screw mechanism that suppresses a decrease in the operation efficiency of the feed screw mechanism and can suppress entry of foreign matter from the outside and leakage of a lubricant to the outside, and an electric actuator including the feed screw mechanism.

Solutions to Problems

In order to solve the above problems, the present invention provides a feed screw mechanism that converts rotary motions of an electric motor into linear motions and transmits the linear motions to an operation target, the feed screw mechanism including: a rotary member having a female screw portion on an inner peripheral surface; a linear motion member having, on an outer peripheral surface, a male screw portion that is directly or indirectly screwed to the female screw portion and making a linear motion with rotation of the rotary member; a lubricant housed between the female screw portion and the male screw portion; a housing that houses the rotary member and the linear motion member, and a wall portion protruding, in a radial direction, from the outer peripheral surface of the linear motion member, in which the wall portion makes a linear motion together with the linear motion member, and an outer radial end portion of the wall portion is disposed: so as not to contact an inner peripheral surface of the housing and a member provided on the inner peripheral surface of the housing; or so as to be slidable with respect to the inner peripheral surface of the housing or the member provided on the inner peripheral surface of the housing.

In the present invention, the wall portion protruding, in the radial direction, from the outer peripheral surface of the linear motion member is provided as described above, so that it is possible by the wall portion to suppress entry of foreign matter from the outside and leakage of the lubricant to the outside. In addition, the outer radial end portion of the wall portion is disposed: so as not to contact the inner peripheral surface of the housing and a member provided on the inner peripheral surface of the housing; or so as to be slidable with respect to the inner peripheral surface of the housing or the member provided on the inner peripheral surface of the housing, and thus when the linear motion member makes a linear motion, the wall portion makes a linear motion together with the linear motion member. At this time, the sliding resistance occurring in the wall portion can be reduced more than the sliding resistance occurring in a conventional member having a sealing function disposed between a rotary member that performs rotary motions and a linear motion member that performs linear motions. Therefore, it is possible to suppress a decrease in the operation efficiency of the feed screw mechanism, and it is possible to suppress entry of foreign matter from the outside and leakage of the lubricant to the outside.

An operation target moved by the linear motion member may be, for example, hydraulic equipment. In this case, even if oil having scattered from the hydraulic equipment adheres to the outer peripheral surface of the linear motion member, the oil can be prevented from moving to the male screw portion because the wall portion is disposed between the male screw portion and the hydraulic equipment. As a result, it is possible to suppress mixing of the oil into the lubricant and to maintain the function of the lubricant. In addition, it is also possible to prevent the oil having scattered from the hydraulic equipment from directly scattering into the feed screw mechanism, so that it is possible to suppress mixing of the oil into the lubricant and to maintain the function of the lubricant.

It is preferable that at least a part of the outer diameter of the wall portion is larger than the inner diameter of the female screw portion of the rotary member. By making at least a part of the outer diameter of the wall portion larger than the inner diameter of the female screw portion, it is possible to effectively suppress entry of foreign matter from the outside and leakage of the lubricant to the outside.

In addition, the wall portion may be disposed on at least a part, in the circumferential direction, of the outer peripheral surface of the linear motion member. In particular, when the wall portion is continuously disposed over the entire circumference of the outer peripheral surface of the linear motion member, it is possible to effectively suppress entry of foreign matter from the outside and leakage of the lubricant to the outside. The wall portion may be disposed only on a part of the outer peripheral surface of the linear motion member.

A protrusion protruding, in the radial direction, from the inner peripheral surface of the housing may be provided between the wall portion and the hydraulic equipment. In this case, the protrusion provided on the inner peripheral surface of the housing can prevent the movement of the oil from the hydraulic equipment side to the wall portion side. In addition, the protrusion can also prevent the movement of the leaked lubricant toward the hydraulic equipment.

The feed screw mechanism according to the present invention can be applied to, for example, an electric actuator including an electric motor and a feed screw mechanism that converts rotary motions of the electric motor into linear motions.

Advantageous Effects of Invention

According to the present invention, it is possible to suppress a decrease in the operation efficiency of the feed screw mechanism and to suppress entry of foreign matter from the outside and leakage of the lubricant to the outside.

DESCRIPTION OF EMBODIMENT

Hereinafter, an embodiment of the present invention will be described with reference to FIGS. 1 to 3.

An electric actuator according to the present embodiment is a so-called linear motion type electric actuator in which the output member moves forward and backward (linear motion) in the axial direction. Hereinafter, a case where the electric actuator according to the present embodiment is used for an electric brake system of an automobile will be described as an example.

Figure 1:
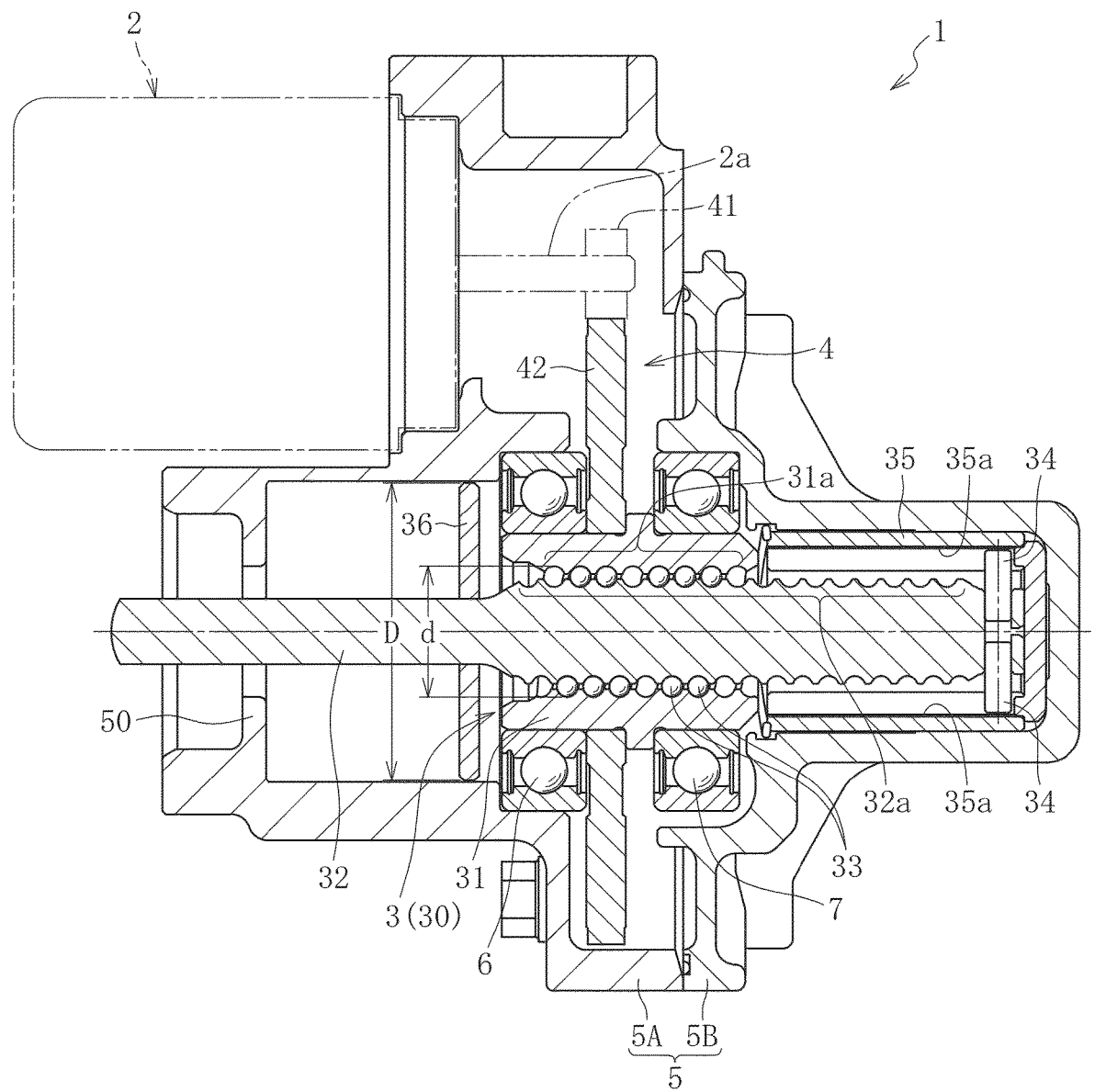
FIG. 1 is a longitudinal sectional view of an electric actuator according to an embodiment of the present invention.
Figure 2:
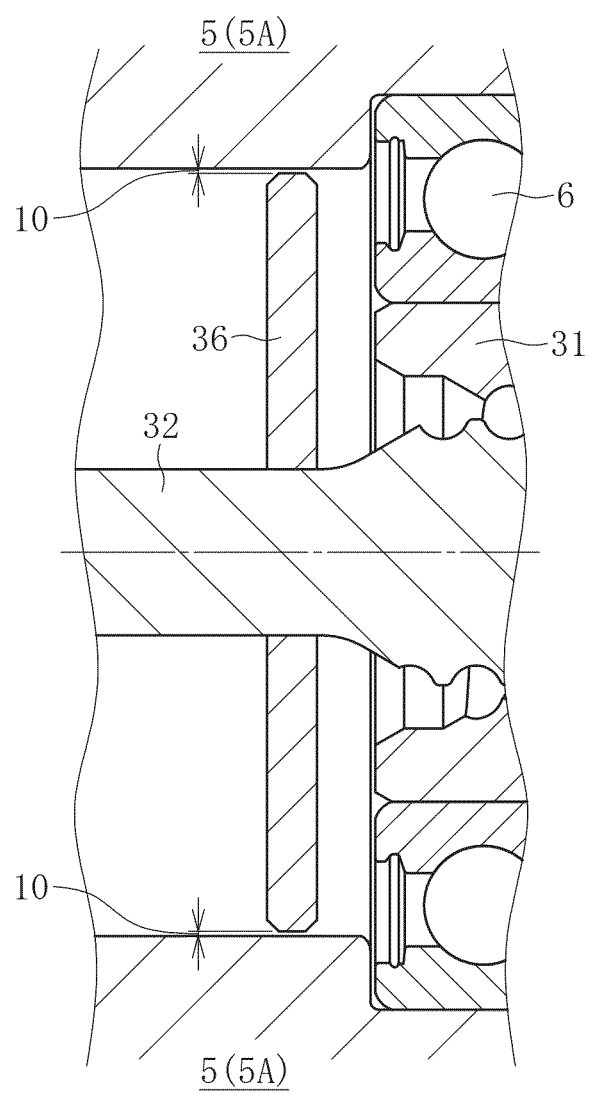
FIG. 2 is an enlarged longitudinal sectional view illustrating a part of the electric actuator according to the present embodiment.

As illustrated in FIG. 1, an electric actuator 1 according to the present embodiment includes an electric motor 2 that generates a rotary driving force, a motion conversion mechanism 3 that converts rotary motions of the electric motor 2 into linear motions parallel to a rotary shaft 2a thereof and outputs the linear motions, a transmission gear mechanism 4 that transmits the rotary driving force from the electric motor 2 to the motion conversion mechanism 3, and a housing 5 that holds them.

In the present embodiment, the housing 5 is divided into two for convenience of assembly. The housing 5 includes a first housing 5A that the electric motor 2 is attached to and a second housing 5B that is connected to the first housing 5A.

The motion conversion mechanism 3 includes a cylindrical nut 31 as a rotary member, a screw shaft 32 as a linear motion member that makes a linear motion with the rotation of the nut 31, and a ball screw mechanism 30 having a plurality of balls 33. The nut 31 is rotatably supported by two rolling bearings 6 and 7 (here, ball bearings) provided in the first housing 5A and the second housing 5B, respectively.

A female screw portion 31a including spiral grooves is provided on the inner peripheral surface of the nut 31. On the other hand, a male screw portion 32a including spiral grooves is provided on the outer peripheral surface of the screw shaft 32 that is inserted into the nut 31. The plurality of balls 33 are housed between the female screw portion 31a and the male screw portion 32a facing each other, and the screw shaft 32 is supported parallel to the rotary shaft 2a of the electric motor 2 by these balls 33. In addition, grease as a lubricant is caused to fill between the female screw portion 31a and the male screw portion 32a in order to improve the operability and durability of the ball screw mechanism 30.

In addition, a pair of rotation locking members 34, that regulate the screw shaft 32 not to rotate around its axis, are provided at the rear end (right end in FIG. 1) of the screw shaft 32. The pair of rotation locking members 34 are formed in a round bar shape (pin shape), and provided such that a part thereof protrudes from the outer peripheral surface of the screw shaft 32. The respective rotation locking members 34 are disposed in guide grooves 35a of a cylindrical guide member 35 housed in the second housing 5B. The respective guide grooves 35a are formed to extend in the axial direction of the screw shaft 32, and the respective rotation locking members 35 are configured to be movable along the respective guide grooves 35a.

The transmission gear mechanism 4 includes a first transmission gear 41 provided on the rotary shaft 2a of the electric motor 2 and a second transmission gear 42 to mesh with the first transmission gear 41. The second transmission gear 42 is provided on the outer peripheral surface of the nut 31 and is configured to rotate together with the nut 31.

In the electric actuator 1 configured as described above, when the rotary shaft 2a of the electric motor 2 rotates, the rotary motion is transmitted to the nut 31 via the first transmission gear 41 and the second transmission gear 42. When the nut 31 rotates, the plurality of balls 33 circulate between the female screw portion 31a and the male screw portion 32a by a non-illustrated circulating member, whereby the screw shaft 32 moves forward or backward in the axial direction thereof. At this time, the screw shaft 32 tries to rotate in the same direction by the rotary motion of the nut 31, but the rotation of the screw shaft 32 is regulated by the rotation locking members 34 provided at the rear end of the screw shaft 32 contacting the guide grooves 35a of the guide member 35. As a result, the screw shaft 32 moves forward or backward without rotating.

When the screw shaft 32 moves forward or backward in its axial direction as described above, a non-illustrated used device (here, a hydraulic cylinder constituting the electric brake system) is operated by the tip (left end in FIG. 1) of the screw shaft 32.

Here, when the electric actuator is used as means for operating the hydraulic cylinder constituting the electric brake system as in the present embodiment, oil that has leaked from the inside of the hydraulic cylinder may scatter, and the oil may adhere to the outer peripheral surface of the screw shaft 32 or scatter to the inside of the ball screw mechanism 30. In this case, when the oil enters the nut 31 as the screw shaft 32 moves forward and backward, the oil is mixed into the grease interposed between the nut 31 and the screw shaft 32, and thus there is a risk that the property of the grease may change to deteriorate the operability and durability of the ball screw mechanism 30. In addition, when the grease in the nut 31 leaks to the outside as the screw shaft 32 moves forward and backward, the amount of the grease decreases, and thus there is a risk that the operability and durability may deteriorate.

Therefore, in the electric actuator according to the present embodiment, the wall portion 36 is provided on the outer peripheral surface of the screw shaft 32 in order to effectively suppress both the entry of foreign matter into the inside and the leakage of the grease to the outside. Hereinafter, the configuration of the wall portion 36 will be described in detail.

As illustrated in FIG. 1, the wall portion 36 is provided on the tip side, beyond the male screw portion 32a, of the screw shaft 32, that is, on an outer peripheral surface (a portion where the male screw portion 32a is not provided) between the male screw portion 32 and hydraulic equipment (here, the hydraulic cylinder) to be operated. The wall portion 36 is fixed so as not to move in the axial direction or rotate in the circumferential direction with respect to the outer peripheral surface of the screw shaft 32. Therefore, when the screw shaft 32 moves forward or backward, the wall portion 36 also moves forward or backward together with the screw shaft 32. The wall portion 36 protrudes, in the radial direction (direction orthogonal to the axial direction), from the outer peripheral surface of the screw shaft 32, and the tip in the protruding direction is disposed so as to be close to the inner peripheral surface of the housing 5 (first housing 5A). That is, the tip (outer radial end portion), in the protruding direction, of the wall portion 36 is disposed so as not to contact the inner peripheral surface of the housing 5 via a gap 10 (see FIG. 2).

Figure 3:
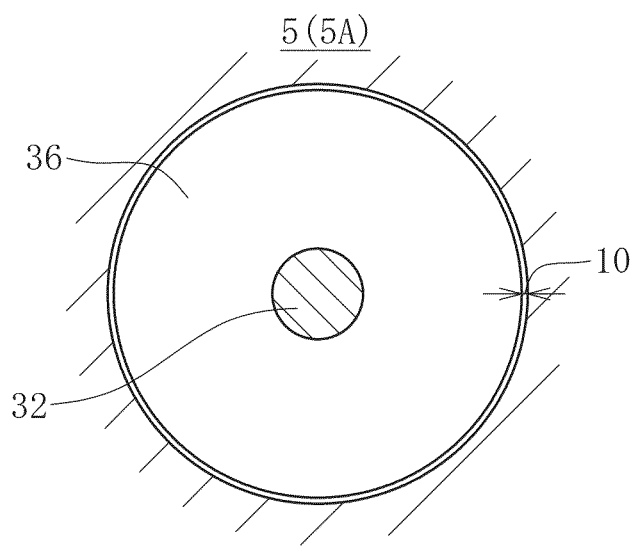
FIG. 3 is a front view of a wall portion as viewed from the axial direction of a screw shaft.

FIG. 3 is a front view of the wall portion 36 as viewed from the axial direction of the screw shaft 32.

As illustrated in FIG. 3, the wall portion 36 is formed in a circular plate shape, and is continuously disposed over the entire circumference of the outer peripheral surface of the screw shaft 32. The shape of the wall portion 36 is not limited to a circular shape, and may be appropriately changed depending on the shape of the inner peripheral surface of the housing 5 (first housing 5A) or the like. The wall portion 36 is provided over the entire circumference of the outer peripheral surface of the screw shaft 32 so as not to create a gap with the outer peripheral surface. In the present embodiment, the wall portion 36 is formed separately from the screw shaft 32, but the wall portion 36 may be integrally molded with the screw shaft 32. As the material of the wall portion 36, for example, a metal material having heat resistance or the like can be used.

In the electric actuator 1 according to the present embodiment, the wall portion 36 as described above is provided on the outer peripheral surface of the screw shaft 32, as described above, so that, even if oil that has scattered from the hydraulic equipment adheres to the outer peripheral surface of the screw shaft 32 or oil that has scattered from the hydraulic equipment directly scatters to the inside of the ball screw mechanism 30, it is possible to effectively suppress the oil from being transmitted along the outer peripheral surface of the screw shaft 32 to enter the nut 31. That is, even if the oil is transmitted along the outer peripheral surface of the screw shaft 32 to move toward the nut 31, the movement of the oil is prevented by the wall portion 36, so that it is possible to suppress the oil from entering the nut 31. As a result, mixing of the oil into the grease in the nut 31 can be effectively suppressed, and a change in the property (lubricity) of the grease due to the mixing of the oil can be avoided, so that it is possible to maintain the operability and durability of the ball screw mechanism 30.

In addition, the wall portion 36 can suppress the oil from entering the nut 31 and also suppress the grease from leaking from the inside of the nut 31. That is, even if the grease in the nut 31 is transmitted along the outer peripheral surface of the screw shaft 32 to move toward the tip (toward the hydraulic equipment) as the screw shaft 32 moves forward and backward, the movement of the grease is prevented by the wall portion 36. As a result, it is possible to suppress a decrease in the amount of the grease in the nut 31, so that it is possible to secure the function of maintaining the operability and durability of the ball screw mechanism 30 by the grease.

Here, when the screw shaft moves forward or backward in a configuration in which a seal member is provided between the nut and the screw shaft as before, the seal member slides, in the linear motion direction and the rotational direction, relative to the screw shaft. Therefore, if the contact area of the seal member with respect to the screw shaft is increased or the contact pressure is increased, the sliding resistance of the seal member with respect to the screw shaft is increased, and the operation efficiency of the screw shaft is decreased. In addition, a method of providing, instead of the conventional seal member, an expandable bellows-shaped boot between the inner peripheral surface of the housing and the outer peripheral surface of the screw shaft to suppress the entry of the oil by the boot is also conceivable. In this method, however, resistance due to the expansion and contraction of the boot and fluctuation in the housing internal pressure occur.

On the other hand, in the embodiment of the present invention, the gap 10 (see FIG. 2) is provided between the outer radial end portion of the wall portion 36 and the inner peripheral surface of the housing 5, and thus, even if the wall portion 36 moves forward or backward together with the screw shaft 32, the wall portion 36 does not slide with respect to the inner peripheral surface of the housing 5. In the present embodiment, the wall portion 36 is disposed so as not to contact the inner peripheral surface of the housing 5 as described above, and thus sliding resistance does not occur between the wall portion 36 and the housing 5 and the wall portion 36 does not hinder the forward and backward movement of the screw shaft 32. Therefore, it is possible to secure the good operability of the ball screw mechanism 30.

In the embodiment of the present invention, the wall portion 36 not contacting the housing 5 is provided on the outer peripheral surface of the screw shaft 32 without using a seal member and a bellows-shaped boot as before, so that it is possible to effectively suppress the entry of the oil from the outside and the leakage of the grease to the outside, and to secure the good operability of the screw shaft, as described above.

Note that the outer radial end portion of the wall portion 36 needs to be disposed so as not to contact not only the inner peripheral surface of the housing 5 but also an inner peripheral surface including another member provided (fixed) on the inner peripheral surface of the housing 5. In the case of the example illustrated in FIG. 1, nothing is provided on the inner peripheral surface of the housing 5 within the reciprocating movement range of the wall portion 36. In a case where another member is provided on the inner peripheral surface of the housing 5, however, the wall portion 36 is disposed so as not to contact the member provided on the inner peripheral surface, so that it is possible to avoid occurrence of sliding resistance due to the movement of the wall portion 36.

In addition, in a case where the ball screw mechanism 30 is used in a horizontally installed posture as in the example illustrated in FIG. 1, it is conceivable that the oil having scattered from the hydraulic equipment may accumulate in the lower portion of the inner peripheral surface of the housing 5 due to the gravity and the oil may enter the nut 31 side through the gap between the lower portion of the inner peripheral surface and the wall portion 36.

In this regard, an annular protrusion 50 (see FIG. 1), protruding in the inner diameter direction over the entire circumference of the inner peripheral surface of the housing 5, is provided between the wall portion 36 and the hydraulic equipment in the present embodiment, so that the protrusion 50 can prevent the movement of the oil toward the nut 31. Even if the grease in the nut 31 is transmitted along the lower portion of the inner peripheral surface of the housing 5 to move toward the hydraulic equipment, the protrusion 50 can prevent the movement of the grease, so that it is possible to suppress the grease from entering the hydraulic equipment side. In the present embodiment, it is possible to more reliably prevent the movement of the oil and the grease by the protrusion 50 of the housing 5 provided between the wall portion 36 and the hydraulic equipment, as described above.

If protruding even slightly from the outer peripheral surface of the screw shaft 32, the wall portion 36 can suppress the entry of the oil and the leakage of the grease. However, a larger protrusion amount of the wall portion 36 is more preferable in terms of suppressing the entry of the oil and the leakage of the grease. Specifically, it is preferable that an outer diameter (maximum outer diameter) D of the wall portion 36 illustrated in FIG. 1 is larger than an inner diameter (maximum inner diameter) d of the female screw portion 31*a* of the nut 31. By making the outer diameter D of the wall portion 36 larger than the inner diameter d of the female screw portion 31*a* of the nut 31 as described above, it is possible to effectively suppress the grease from leaking from the inside of the nut 31 and the oil from entering the nut 31. Without being limited to the case where the entire outer diameter of the wall portion 36 is larger than the inner diameter of the female screw portion 31*a* of the nut 31, a case may be possible where only a part of the outer diameter of the wall portion 36 is larger than the inner diameter of the female screw portion 31*a* of the nut 31. In other words, the outer diameter of the wall portion 35 may be formed to be larger than the inner diameter 31*a* of the female screw portion of the nut 31 in a part, in the circumferential direction, of the outer peripheral surface of the screw shaft 32.

Although the embodiment of the present invention has been described above, the present invention is not limited to the above-described embodiment, and various modifications can be made without departing from the gist of the invention.

In the above-described embodiment, the case, where the tip, in the protruding direction, of the wall portion 36 is disposed so as not to contact the inner peripheral surface of the housing 5, has been described as an example. In order to improve sealability, however, the tip, in the protruding direction, of the wall portion 36 may be brought into contact with the inner peripheral surface of the housing 5 or the inner peripheral surface of another member provided on the inner peripheral surface of the housing 5, to the extent of being slidable. Also, in this case, a decrease in the operation efficiency of the ball screw mechanism can be reduced more than in a conventional configuration in which a member having a sealing function is disposed between a rotary member that performs rotary motions and a linear motion member that performs linear motions. Therefore, it is possible to suppress the entry of foreign matter from the outside and the leakage of the lubricant to the outside. That is, when the linear motion member makes a linear motion as the rotary member rotates in the conventional configuration, the seal member slides in both the linear motion direction and the rotational direction with respect to the linear motion member. In the case of the wall portion 36 according to the present invention, however, the seal member slides only in the linear motion direction with respect to the inner peripheral surface of the housing 5 or of another member, so that the sliding resistance can be reduced and a decrease in the operation efficiency of the ball screw mechanism can be suppressed. As the material of the wall portion 36, a slidable resin material, a rubber material, or the like can be used.

Figure 4:
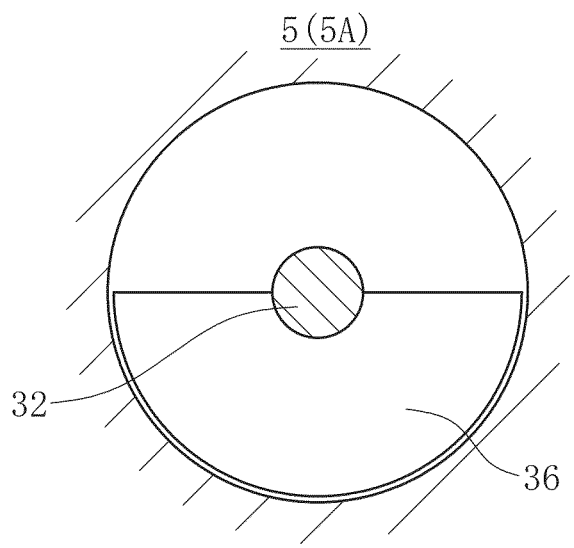
FIG. 4 is a front view illustrating a modification of the wall portion.

As in the example illustrated in FIG. 4, the wall portion 36 may be provided only on a part, in the circumferential direction, of the outer peripheral surface of the screw shaft 32. In the example illustrated in FIG. 4, the wall portion 36 is provided in a semicircular shape over the circumferential region of the lower half of the screw shaft 32, but the arrangement and shape of the wall portion 36 can be appropriately changed. In addition, a plurality of the wall portions 36 may be disposed at intervals in the circumferential direction of the screw shaft 32.

In addition, in the above-described embodiment, the case has been described as an example, where the electric actuator according to the present invention is used as an electric actuator for operating hydraulic equipment of the electric brake system. However, the device or member to be operated may be one other than hydraulic equipment. Therefore, the electric actuator according to the present invention can also be used as an electric actuator that operates a device or a member other than hydraulic equipment, and the wall portion 36 can also be used as one that suppresses the entry of foreign matter other than oil.

In addition, the motion conversion mechanism that converts rotary motions of the electric motor into linear motions is not limited to the ball screw mechanism in which the nut (female screw portion) and the screw shaft (male screw portion) are indirectly screwed via balls, and may be a sliding screw mechanism in which a nut (female screw portion) and a screw shaft (male screw portion) are directly screwed without using balls. That is, the present invention can be applied not only to the ball screw mechanism that is an example of the feed screw mechanism, but also to the sliding screw mechanism that is another example.

REFERENCE SIGNS LIST

1 Electric actuator
2 Electric motor
3 Motion conversion mechanism
4 Transmission gear mechanism
5 Housing
10 Gap
30 Ball screw mechanism 31 Nut (Rotary member)
31a Female screw portion
32 Screw shaft (Linear motion member)
32a Male screw portion
33 Ball
36 Wall portion
50 Protrusion

The invention claimed is:

1. A feed screw mechanism that converts rotary motions of an electric motor into linear motions and transmits the linear motions to an operation target, the feed screw mechanism comprising:
   a rotary member having a female screw portion on an inner peripheral surface;
   a linear motion member having, on an outer peripheral surface, a male screw portion that is directly or indirectly engaged with the female screw portion and making a linear motion with rotation of the rotary member;
   a lubricant housed between the female screw portion and the male screw portion;
   a housing that houses the rotary member and the linear motion member; and
   a wall portion protruding, in a radial direction, from the outer peripheral surface of the linear motion member, wherein
   the wall portion is configured to move linearly together with the linear motion member,
   the wall portion is disposed so as not to contact an inner peripheral surface of the housing and a member provided on the inner peripheral surface of the housing, and
   only a part of an outer perimeter of the wall portion is larger than an inner diameter of the female screw portion of the rotary member.

2. The feed screw mechanism according claim 1, wherein the wall portion is disposed on at least a part, in the circumferential direction, of the outer peripheral surface of the linear motion member.

3. An electric actuator comprising an electric motor and the feed screw mechanism according to claim 1 that converts rotary motions of the electric motor into linear motions.

4. The feed screw mechanism according to claim 1, wherein
   the operation target is hydraulic equipment, and
   the wall portion is disposed between the male screw portion of the linear motion member and the hydraulic equipment operated by the linear motion member.

5. The feed screw mechanism according to claim 4, further comprising a protrusion, protruding in a radial direction from the inner peripheral surface of the housing, provided between the wall portion and the hydraulic equipment.

* * * * *